United States Patent [19]

Jeng

[11] 4,103,701

[45] Aug. 1, 1978

[54] FREEZE-PROOF CAP FOR OUTDOOR FAUCET

[76] Inventor: Duen-Ren Jeng, 5334 Fredelia Dr., Toledo, Ohio 43623

[21] Appl. No.: 820,346

[22] Filed: Jul. 29, 1977

[51] Int. Cl.² ............................................. F16K 51/00
[52] U.S. Cl. .................................. 137/375; 220/85 P; 150/52 R
[58] Field of Search ..................... 220/215, 85 P, 3.8; 137/301, 375; 174/67; 222/182; 138/32; 150/52 R

[56] References Cited

U.S. PATENT DOCUMENTS

| | | | |
|---|---|---|---|
| 2,080,728 | 5/1937 | MacNeill et al. | 220/85 P |
| 2,686,530 | 8/1954 | Dire | 137/375 |
| 3,858,632 | 1/1975 | Stout | 137/375 |
| 4,071,043 | 1/1978 | Carlson | 137/375 |

*Primary Examiner*—George T. Hall

[57] ABSTRACT

A thermally insulated freeze-proof cap which can be easily installed with a specially designed face plate on the existing outdoor faucet without dismantling any part of a faucet. The invented cap can prevent freezing of water pipe line or the like and heat loss through faucet and space between the wall and pipe line.

2 Claims, 3 Drawing Figures

FREEZE-PROOF CAP FOR OUTDOOR FAUCET

DESCRIPTION OF THE INVENTION

The winter of 1977 was the coldest in the 103 year history of weather record keeping in the Northeast area of United States. The average temperature for 3 months of winter (December, January and February) also set a record. The average was 19.9° F and it was about 10° below normal average for the 3 months. One cold spell in midwinter stretched to 45 days without the mercury climbing above freezing. It caused thousands and thousands of water pipe lines for homes and industries to freeze and burst.

Due to the cold weather, it also created a gas shortage for building heating. It forced many industrial and commercial customers of gas companies to shut down the supply of gas and leaving thousands of area workers jobless.

The present invention is directed to a new apparatus which can be easily fastened to the existing garden or outdoor faucet to prevent heat loss from the faucet by convection heat transfer as well as the heat leakage through the space between the wall and the pipe line. It is therefore the freezing of water in the pipe line and the faucet can be prevented.

In a more specific aspect, the invention related to a thermally insulated unit which is mountable on an outdoor faucet or a valve or the like to prevent freezing of water line and heat loss through the faucet and the space between the pipe line and the wall.

Various freeze-proof faucets are known on the market but these types of faucet normally possess a long extended shaft which is capable of shutting off water line not at the location of faucet exposed to the external cold area but at the location which is inside the wall. The water which fills the space between the valve and faucet mouth is then drained out to prevent freezing. These types of faucet can not prevent conduction and convection heat loss from the pipe and faucet.

The present invention is based on the totally different concept which is to thermally insulate the whole faucet to prevent heat loss. It is therefore, the invented thermally insulated cap can also be used on the traditional freeze-proof faucet for the purpose of double protection and prevent the heat leakage through the space between the pipe and the wall.

To install a traditional freeze-proof faucet to an existing water line requires a professional service or a tedious plumbing work which can not be performed by an ordinary person. Furthermore it requires rather expensive tools.

It is an object of this invention to provide an simple means of avoiding outdoor faucet to freeze and heat loss from the leaking space. The application of present invented device is simple and can be installed easily to an existing regular outdoor faucet, or to the normal freeze-proof faucet or the like for double protection.

Various other objects, advantages and features of the invention will become apparent to those skilled in the art from the following description taken in conjunction with the accompanying drawings, in which, FIG. 1 is an elevational view of invented freeze-proof thermally insulated cap for outdoor faucet or the like.

FIG. 2 is the top view and the side view of a face plate for attaching the thermally insulated cap to an existing outdoor faucet or the like.

The following is a discussion and description of a preferred specific embodiment of the new freeze-proof outdoor faucet cap and installment face plate of the new invention, such being made with reference to the drawings whereon the same reference numbers are used to indicate the same or similar parts and/or structure. It is to be understood by those skilled in the art that this description is intended to illustrate and not to limit the scope of the invention.

Figure 1:
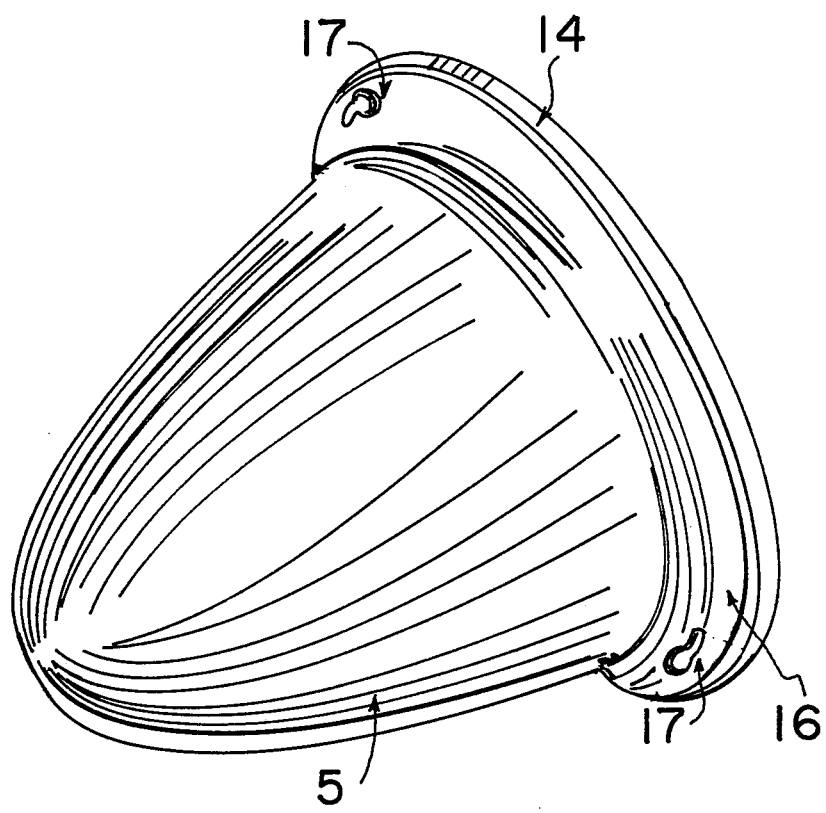
Figure 3:
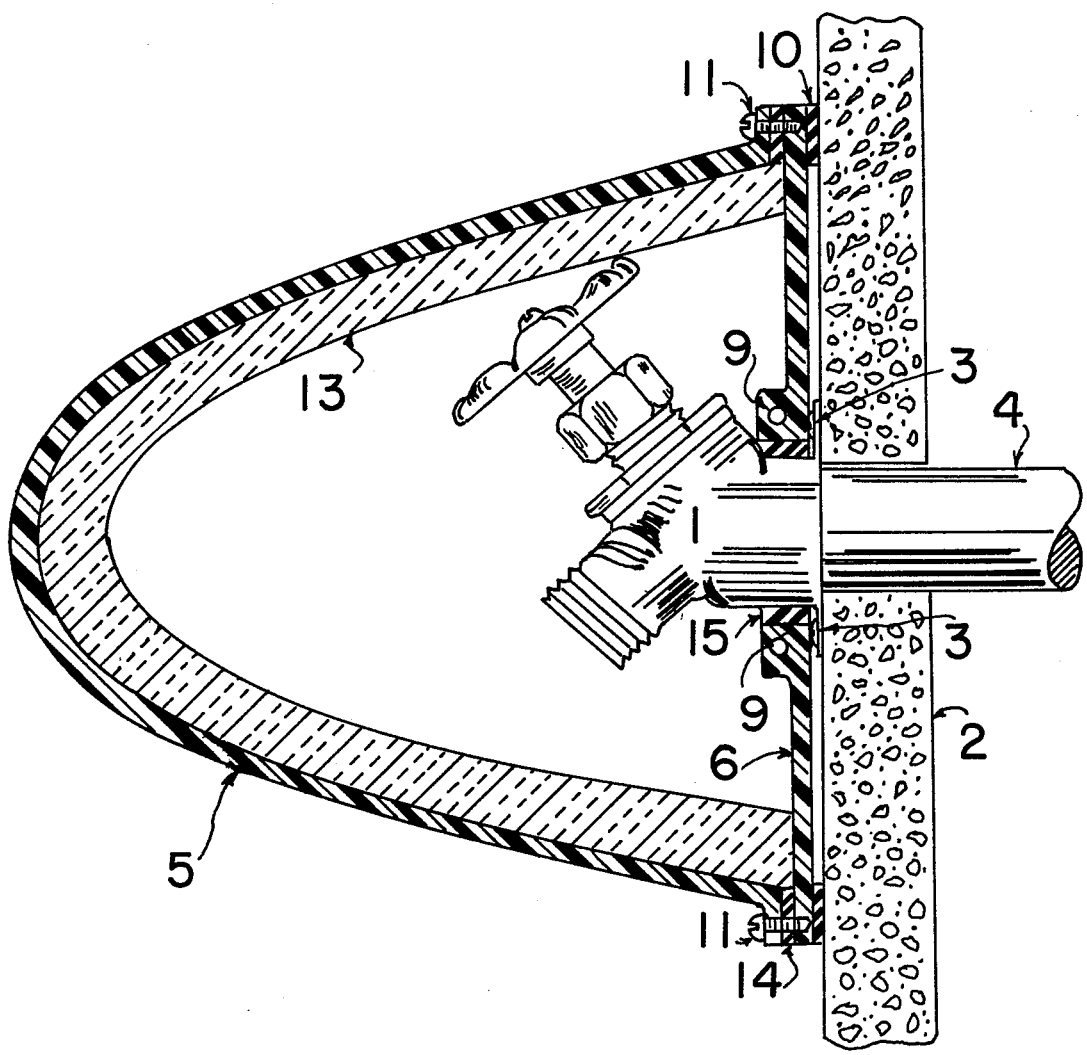
FIG. 3 is a cross-sectional view of invented freeze-proof cap when it is installed on outdoor faucet mounted with face plate on the building wall.

Referring now to the drawings in detail, FIG. 3 of drawings illustrates a general garden or outdoor faucet or valve or the like 1 which is fixedly attached to the exterior surface of the building wall 2 by screw or other fastening means 3 and then connects to water pipe line 4. The faucet 1 illustrated in the drawing is merely illustrative of a suitable faucet in which an invented freeze-proof cap 5 can be used and it is to be understood that cap means can be mounted on valve or the like. A preferred specific embodiment of freeze-proof thermally insulated cap for faucet of the invention is shown generally at 5. Its elevated drawing is shown in FIG. 1. The invented freeze-proof thermally insulated cap 5 has semi-spherical shape with flange 16 which provides a means of attaching a cap to a face plate 6 by two set screws 11 through two holes 17 provided on flange 16 and two threaded holes 12 provided on the face plate 6. The cap 5 may be manufactured by using PVC or plastic type of material with low thermal conductivity yet it is durable to resist impact. A layer of fiberglass or styrofoam or the like material 13 which has a high thermal insulating characteristic is layed and glued on the inner surface of cap to form a thermally insulated layer. Another layer of sponge rubber or rubber or the like soft material 14 is glued along the edge of the flange on the side of the surface which is in direct contact with the face plate. This layer of material provides a means of preventing heat loss through the gap between the flange and face plate.

Figure 2:
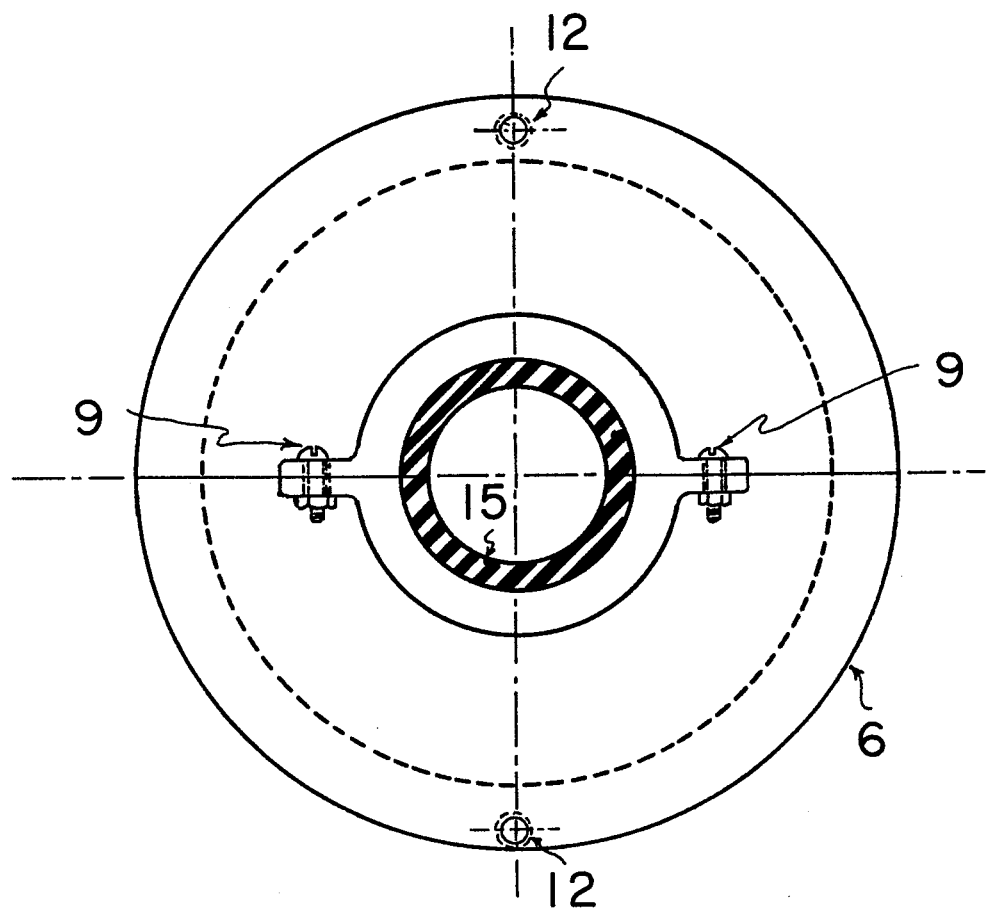
Figure 2:
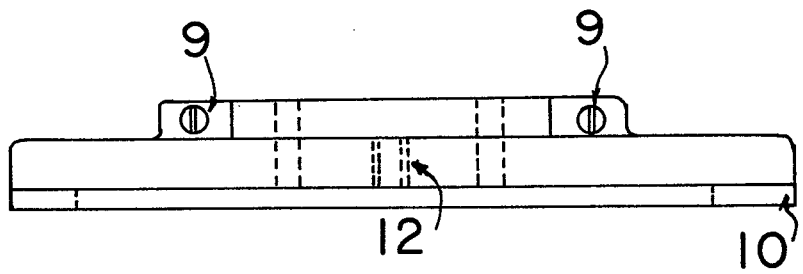

A face plate 6 has a cylindrical shape and it is divided into two half cylindrical plates. The detail description of this face plate is given in FIG. 2. At the center of plate 6, it has a cylindrical recess and a layer of sponge rubber 15 glued around the recess which can be adapted to receive the neck portion of the faucet. Therefore this face plate can be mounted on the neck of the faucet without dismantling any part of existing faucet. This face plate shall be installed as close as possible to the exterior surface of wall. These two pieces of semi-circular plates are fastened to the neck of faucet by means of two set screws 9. On the back side of face plate, a ring type of rubber sponge or fiberglass type of soft material 10 is glued around the edge of plate. By pushing the plate as close as possible to the exterior surface of the wall, this soft material enable to prevent the leak of heat from inside wall through the space between the face plate and the wall surface.

While the invention has been described in connection with preferred specific embodiment thereof, it will be understood by those skilled in the art that such is intended to illustrate and not to limit the scope of the invention which is defined by the claims.

Two claims are made in this invention:

1. A thermally insulated cap for protecting the outdoor faucets and the like from freezing and to reduce the heat leakage from a building through the space between a wall and a pipe line, comprising a thermally insulated cap section and a face plate providing means for rigidly mounting the said cap to an existing outdoor faucet adjacent to a wall, the cap integral formed with a rigid shell, preferably of hemi-spherical in shape, being made of PVC or plastic type of material with its inner surface thermally insulated using a layer of fiberglass or styrofoam, at the opening end of the said cap, a ring shape flange on which a layer of sponge rubber glued along the edge facing the face plate providing a means for perfectly shielding the faucet when the said cap being mounted on the face plate by two adapting screws provided on the flange, the mounting face plate having a cylindrical shape and being divided into half cylindrical plates with its center having a concentric cylindrical recess with a layer of sponge rubber glued around, with two screws passing thru two apertured lugs adapted to draw said plates together yielding means for fastening the said plates to the neck of faucet without dismantling any part of existing faucet, a ring type of rubber sponge glued around the edge of plates on the side facing to a wall to minimizing the heat loss thru the space between the plate and the wall.

2. In combination, an outdoor faucet, having two half cylindrical face plates rigidly clamping on its neck as close as possible to the exterior surface of a wall by means of two screws extending through two apertured lugs, a thermally insulated cap having its ring shaped flange adapted to face plate and tightly mounted to the said plate by means of two set screws provided on the flange providing means for entirely enclosed the faucet to prevent it from freezing.

* * * * *